United States Patent
Mischenko

[11] 3,897,025
[45] July 29, 1975

[54] AUTOMATIC REWIND MECHANISM FOR A MOTION PICTURE PROJECTOR

[75] Inventor: Nicholas Mischenko, Mount Prospect, Ill.

[73] Assignee: Bell & Howell Company, Chicago, Ill.

[22] Filed: May 31, 1974

[21] Appl. No.: 474,995

[52] U.S. Cl. .................................. 242/189; 242/205
[51] Int. Cl.² ............ B65H 59/38; B65H 63/02; G03B 1/04; G11B 15/32
[58] Field of Search ........... 242/189, 192, 201, 204, 242/205, 75.5

[56] References Cited
UNITED STATES PATENTS

| | | | |
|---|---|---|---|
| 2,745,604 | 5/1956 | Masterson | 242/75.5 X |
| 3,695,549 | 10/1972 | Von Hornstein et al. | 242/189 |
| 3,787,003 | 1/1974 | Mischenko | 242/192 |

Primary Examiner—Leonard D. Christian
Attorney, Agent, or Firm—John E. Peele, Jr.; Jack C. Berenzweig

[57] ABSTRACT

An automatic rewind mechanism for use in rewinding film across the projection axis of a motion picture projector having a supply reel with one end of the film attached thereto, a take-up reel, a forward projection mode, a rewind mode, a projection axis, and a shuttle mechanism for moving the film across the projection axis. The rewind mechanism comprises a motor drive means; a first roller supported for movement from an ineffective position to an effective position for engaging the flanges of the supply reel, the roller in its effective position being rotatable by the motor drive means to winding the film onto the supply reel; a second roller supported for movement from an ineffective position to an effective position for engaging the flanges of the take-up reel, the second roller in its effective position being rotatable by the motor drive means for winding the film onto the take-up reel; a sensing means for sensing an increase in film tension incident to an end of run condition upon completion of forward projection of the film; and a control means responsive to the sensing means for automatically moving the second roller into its ineffective position and for moving the first roller into its effective position thereby rewinding the film from the take-up reel across the projection axis to the supply reel.

6 Claims, 4 Drawing Figures

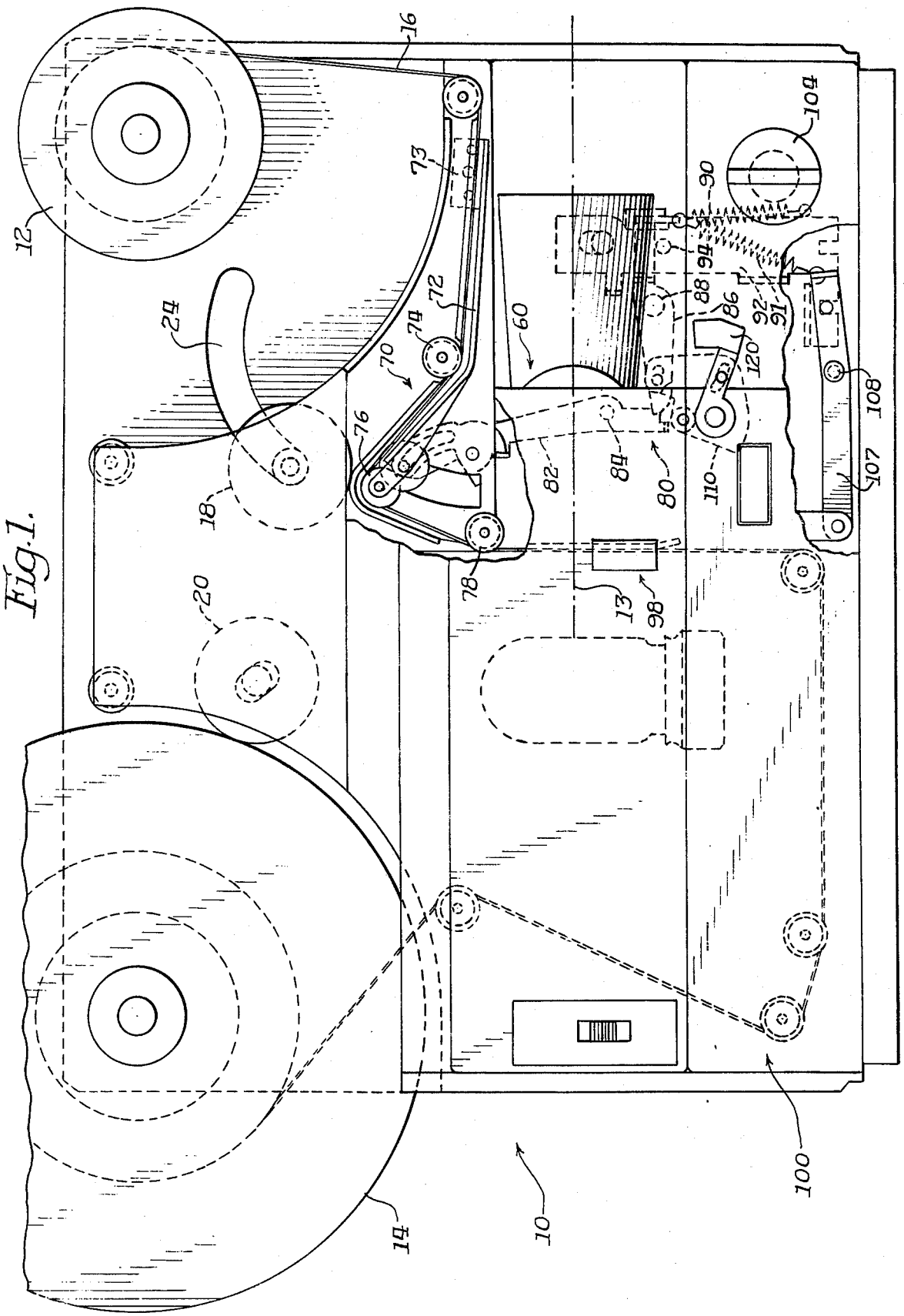

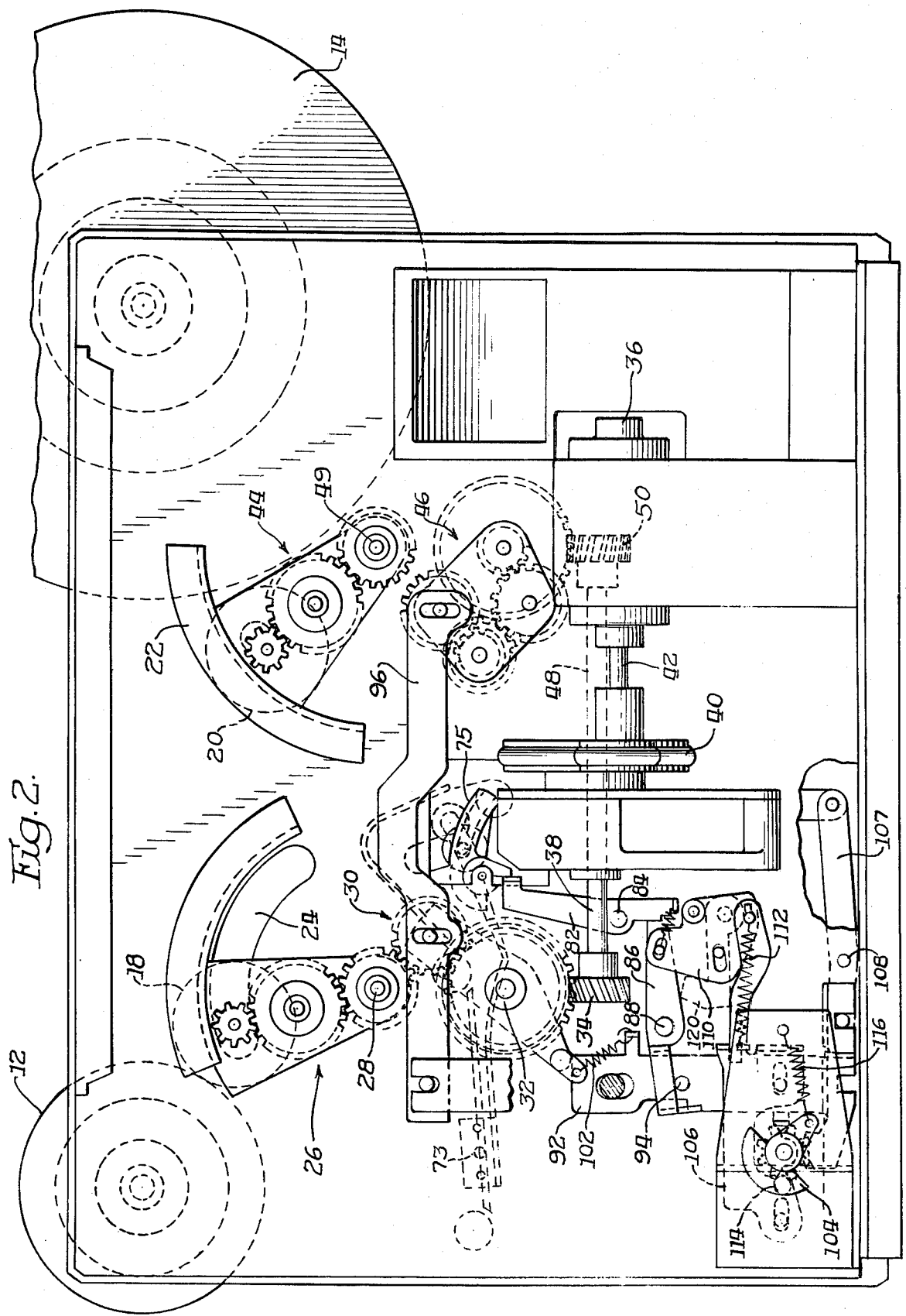

PATENTED JUL 29 1975   SHEET 3   3,897,025
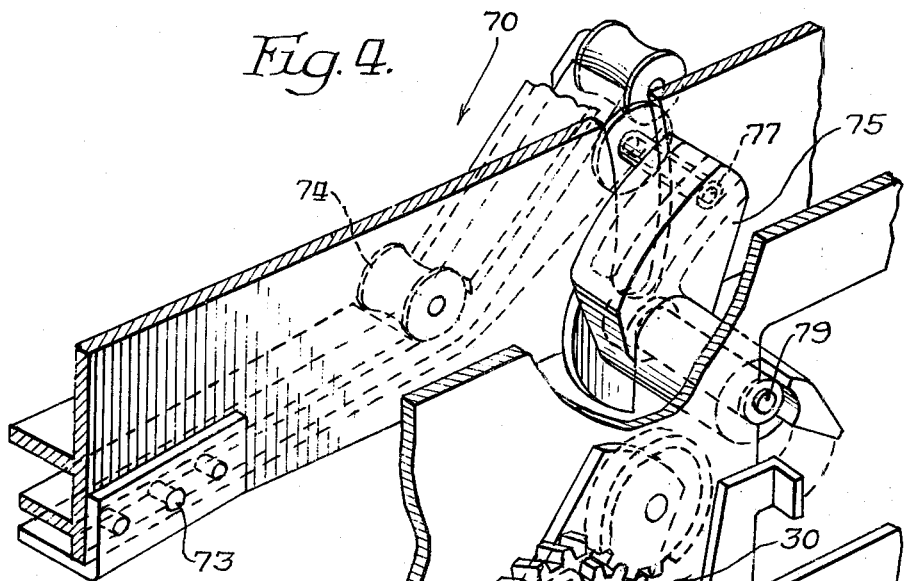
Fig. 4.
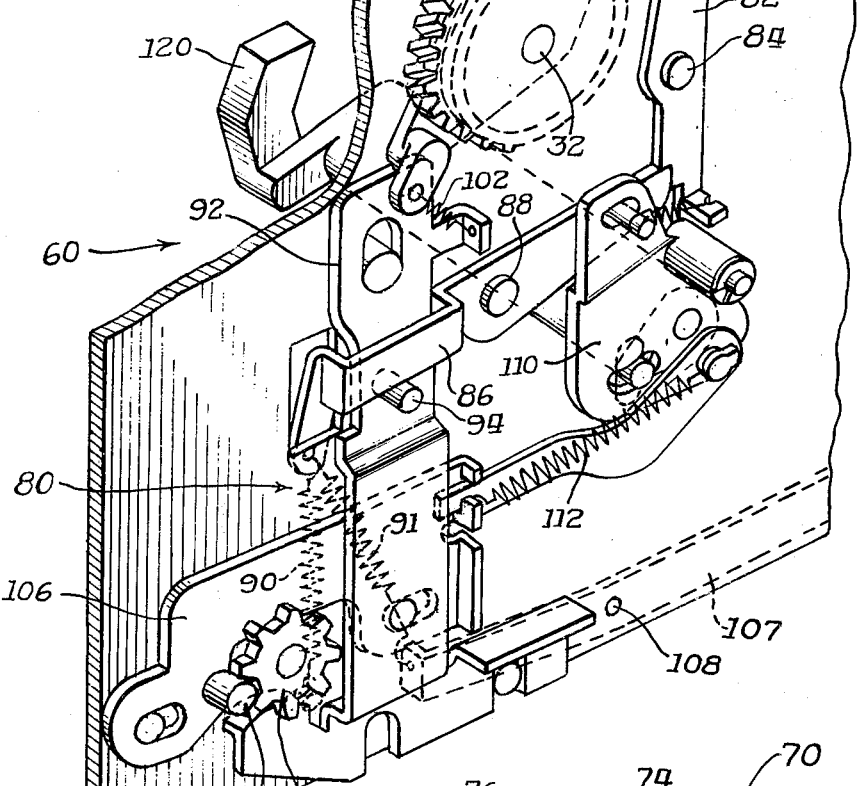
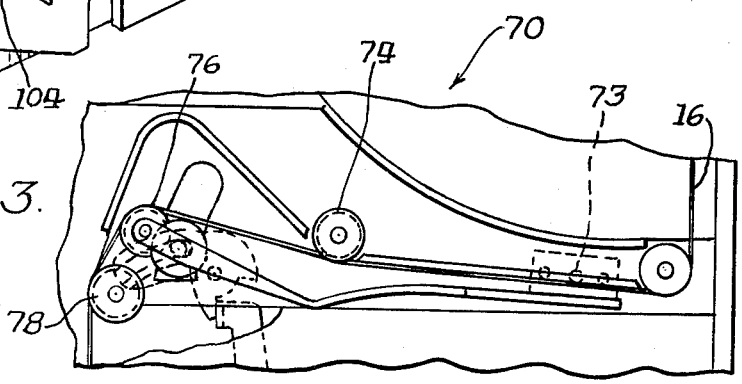
Fig. 3.

AUTOMATIC REWIND MECHANISM FOR A MOTION PICTURE PROJECTOR

BACKGROUND OF THE INVENTION

The present invention relates to motion picture projectors, and more particularly, to an improved rewind mechanism for a motion picture projector whereupon the completion of the forward project mode, the rewind mechanism automatically rewinds the film internally within the projector so that the film passes across the projection axis.

Rewind mechanisms for motion picture projectors are well known in the art. These prior art rewind mechanisms may be generally classified into three general types. The first type of prior art rewind mechanism provides for rewinding the film externally from the projector whereby the rewound film does not pass across the projection axis of the projector. A second type of rewind mechanism, heretofore utilized, has been designed for use in combination with a projector which utilizes a spindle driven supply reel. In this type of rewind mechanism, both internal rewind as well as external rewind of the film have been provided in the past. Finally, the third group of rewind mechanisms which have heretofore been utilized, are rewind mechanisms for use with roller driven supply reels and/or take-up reels. Two such rewind mechanisms are disclosed in U.S. Letters Pat. Nos. 3,761,167 and 3,787,003, both assigned to the Bell & Howell Company. In the latter patent, a manual rewind mechanism is provided. After the projector has completed its forward projection mode, the operator must manually place the projector into the rewind mode to rewind the film. In the former patent, an automatic sensing circuit is provided which senses the end of the project mode and automatically places the projector into a rewind mode. The rewind mechanism in this projector utilizes an electronic control circuit which senses tension in the film and which electronically converts the projector from its forward project mode to its rewind mode.

The present invention provides an automatic rewind mechanism which is suitable for use in a projector having a roller driven supply reel and a roller driven take-up reel, whereby the film may be rewound across the projection axis within the projector itself automatically after a mechanical sensing mechanism recognizes the completion of the forward project mode. Specifically, the rewind mechanism may be used in the type of projector disclosed in Letters Pat. No. 3,787,003.

The general purpose of this invention is to provide an automatic rewind mechanism for use in combination with a motion picture projector having a roller driven supply reel and a roller driven take-up reel wherein the film may be automatically rewound within the motion picture projector across the projection axis after the completion of the forward project mode. To attain this, the present invention utilizes a mechanical sensor circuit which senses a change of tension in the film incident to the completion of the forward project mode. This sensor means actuates a mechanical control means which automatically retracts the roller which has been driving the take-up supply reel in the forward project mode to an ineffective position and moves the roller which is designed to drive the supply reel during a rewind mode into an effective position for driving the supply reel, thereby rewinding the film back onto the supply reel.

It is therefore an object of the present invention to provide an automatic rewind mechanism for use in combination with a motion picture projector having a roller driven supply reel and a roller driven take-up reel.

Another object of the invention is to provide a motion picture projector utilizing a mechanical sensor and control mechanism to change the projector automatically from the forward project mode to the rewind mode.

A further object of the invention is the provision of an automatic rewind mechanism which enables the film to be automatically rewound across the projection axis of the projector.

Other objects and many of the attendant advantages of this invention will become readily appreciated as the same becomes better understood by reference to the following detailed description when considered in connection with the accompanying drawings.

BRIEF DESCRIPTION OF THE DRAWINGS

FIG. 1 is a schematic elevational view of the front of a motion picture projector embodying the principals of this invention.

FIG. 2 is a rear elevational view of the motion picture projector shown in FIG. 1 with the cover removed which illustrate the apparatus utilizing the principals of this invention.

FIG. 3 illustrates an enlarged view of a portion of the apparatus shown in FIG. 1.

FIG. 4 is a prospective view partially in cross section of a portion of the mechanism shown in FIG. 2.

DESCRIPTION OF THE PREFERRED EMBODIMENT

Referring now to the drawings, wherein like reference characters designate like or corresponding parts throughout the several views, there is shown in FIG. 1 a motion picture projector 10 having a roller driven supply reel and a roller driven take-up reel. The motion picture projector 10 is of the type disclosed in United States Letters Pat. No. 3,787,003, assigned to the Bell & Howell Company. As mentioned above, the motion picture projector disclosed in Letters Pat. No. 3,787,003 utilizes a manual rewind mechanism whereby the operator must place the projector into the rewind mode after the completion of the forward project mode. The present invention provides an automatic rewind mechanism for use in this type of motion picture projector which automatically senses the end of the forward project mode and places the projector into its rewind mode without the need for operator assistance. Also this mechanism can be actuated manually at any point before film gets to the end.

The motion picture projector 10 includes a supply reel 12 and a take-up reel 14 which are supported rotatably on the projector 10. The film 16 is threaded through the projector from the supply reel 12 across the projection axis 13 to the take-up reel 14. A supply roller or puck 18 is arranged to engage the flanges of the supply reel 12 to rotate the supply reel 12 counterclockwise when the projector 10 is operated in a reverse direction. Similarly, a take-up roller or puck 20 is provided to drive the take-up reel 14 by engaging its flanges when the projector 10 is operated in a forward direction. The rollers 18 and 20 may be pivoted into engagement with the respective reels along arcs defined by slots 22 and 24 which are formed in the projector housing.

Referring to FIG. 2, the supply roller 18 may be pivoted into engagement with the supply reel 12 and rotated by a roller drive train 26 which is pivoted about a point 28 between an effective position as shown in FIG. 2 and an ineffective position, a clockwise rotation from that shown in FIG. 2. The roller drive train 26 may be activated when a selectively insertable gear cluster 30 is brought into engagement therewith, in the manner fully described in Letters Patent No. 3,787,003. The gear cluster 30 is pivoted about pivot point 32 and meshes with a worm gear 34 which is coupled to a drive motor 36 through a shaft 38, pulleys 40 and a drive shaft 42. In like fashion, the take-up roller 20 is activated through a roller drive train 44 and the selectively insertable gear cluster 46 which is coupled to the motor 36 through the shaft 42, pulleys 40, a shaft 48 and a worm gear 50. The drive train 44 is pivotable about a pivot point 49 from an inoperative position as shown in FIG. 2, clockwise, to an operative position which would engage the take-up roller 20 with the take-up reel 14.

Again referring to FIGS. 1 and 2, as well as to FIGS. 3 and 4, the projector 10 also comprises an automatic rewind mechanism 60. The automatic rewind mechanism 60 includes a tension sensing mechanism 70 which acts as a sensor of film tension, to be described below, and a control mechanism 80. In the preferred embodiment of the invention, the tension sensing mechanism 70 comprises a snubber. When the film 16, which is securely attached at its trailing end to the hub of the supply reel 12, is completely projected, a tension created in the film causes the tension sensing mechanism 70 to be urged into an actuating position which in turn causes the control mechanism 80 to be actuated. The control mechanism 80 then automatically changes the projector 10 from its forward project mode to its rewind mode. The tension sensing mechanism 70 comprises a flexible member 72 which is anchored to the projector housing at the point 73. The tension sensing mechanism 70 deflects downwardly upon an increase in tension caused by the film 16 which is threaded through the tension sensing mechanism 70 from the supply reel 12 around idler pulleys 74, 76, and 78, in a manner to be described below. Upon an increase in film tension, the tension sensing mechanism 70 deflects downwardly, as shown in FIG. 3.

The control mechanism 80 is actuated by the downward deflection of the tension sensing mechanism 70. The control mechanism 80 comprises a lever 82 which is pivoted at a point 84. The movement of the lever 82 about the point 84 releases a trigger latch 86 which is pivotable about the point 88. The trigger latch 86 is spring loaded by a spring 90. When the trigger latch 86 is triggered by the lever 82, a slider 92 moves downwardly. The position of the slider 92 in FIG. 2 is the slider's position after the trigger latch 86 has been triggered. This position is caused as a result of the pressure placed on a pin 94 by the spring 90 pulling downwardly on the trigger latch 86. Since the slider 92 moves downwardly, it causes the gear cluster 30 to pivot around the pivot point 32 connecting the roller drive train 26 to the drive motor 36 as previously described and moving the supply roller 18 from its ineffective position to its effective position shown in FIG. 2 engaging the flanges of the supply reel 12. The movement of the roller drive train 30 into its effective position automatically causes a lever 96 to move into a neutral position. When lever 96 moves into a neutral position, this causes the gear cluster 46 to pivot out of engagement with the drive train 44 thereby causing the roller 20 to move into its ineffective position thus no longer driving the take-up reel 14. The control by the lever 96 of the drive train 44 is fully described in U.S. Letters Pat. No. 3,787,003, and further description herein is unnecessary. In this manner, the projector 10 is automatically switched from its forward project mode to its rewind mode without operator assistance.

Again referring to FIGS. 1–4, the operation of the rewind mechanism 60 will be described in greater detal. In the project mode, the film 16 passes from the supply reel 12 through the tension sensing mechanism 70. The film passes around the idler pulleys 74, 76 and 78 across the projection axis 13, through a conventional pressure shoe and film shuttle 98, to a snubber 100 and then to the take-up reel 14. During the forward project mode, the take-up reel 14 is driven by the take-up roller 20 which is driven by the drive motor 36 and gear clusters 46 and drive train 44 in the manner previously described. At the end of the projection mode, the film 16 which is secured to the hub of the supply reel 12 stops moving. Since the film shuttle mechanism 98 continues to pull the film downwardly, the tension in the film is increased. This increase in tension is sensed by the tension sensing mechanism 70 which in turn is caused to deflect downwardly into the position shown in FIG. 3. A protrusion 75 (FIG. 4) which cooperates with the tension sensing mechanism 70 and is supported for movement with the tension sensing member 70 through a shaft 77 and rotates about a pivot 79 which is fixed to the projector housing, pivots the lever 82 about the pivot point 84. This releases the trigger latch 86 which is pivoted about the pivot point 88. The triggering of the trigger latch 86 intercepts the pin 94 on the slider 92 thereby causing the slider 92 to move downwardly. The downward movement of the slider 92 causes the gear cluster 30 to pivot about the pivot point 32 causing the drive train 26 to move the supply roller 18 into its effective position and driving the flanges of the film supply reel 12 through the gear cluster 30 and drive train 26. As described previously, and as fully described in said aforementioned U.S. Letters Pat. No. 3,787,003, the movement of the supply roller 18 including the drive train 26 into its effective position by the gear cluster 30 also causes the lever 96 to move to a neutral position. The movement of the lever 96 to a neutral position disengages the gear cluster 46 from the drive train 44 and causes the take-up roller 20 to move into its ineffective position.

In addition to engaging the supply roller 18 and disengaging the take-up roller 20, the triggering of the trigger latch 86 as a result of the movement of the slider 92 also causes a lever 107 to pivot about shaft 108 to retract the pressure shoe and film shuttle mechanism 98 to enable rewinding of the film 16 without interference from the shuttle mechanism and pressure shoe 98.

A spring 102 maintains the gear cluster 30 in contact with the slider 92 so that the position of the gear cluster 30 is controlled by the movement of the slider 92. A control knob 104 (FIG. 1) is provided. In the project mode, the control knob 104 is rotated clockwise 45° from the position shown in FIG. 1. Triggering of the trigger latch 86, as a result of the tension signifying the end of the project mode causes the control knob 104 to rotate into the neutral position shown in FIG. 1. This is caused by the sliding movement of the plate 106, which moves as a result of the rotational movement of the reset cam 110. As this cam rotates, the action releases the tension caused by a spring 112 thereby moving the plate 106 to the left. This causes a pin 114 to disengage the control knob 104 and to enable return of the knob to its neutral position as a result of the spring tension in the spring 116 (FIG. 2).

After the film has been completely rewound into the supply reel 12, a reset control 120 (FIG. 1) may be depressed thereby locking the trigger latch 86 to the lever 82 as shown in FIG. 4. The spring 91, as shown in FIG. 1, moves the slider 92 upwardly causing the gear cluster 30 to move thus disengaging the roller drive train 26 thereby stopping the drive of supply roller 18 and causing the supply roller 18 to move back to its ineffective position. In this condition, the supply roller 18 and the take-up roller 20 are both in ineffective positions, with their respective drive trains 26 and 44 disengaged from gear clusters 30 and 46. The lever 96 remains in the neutral position to which it was caused to be displaced when the triggering of the rewind mechanism occurred. The reset control 120, having been reset, the lever 107 re-engages the pressure shoe and side tension guides (not shown) making the projector ready for another projection cycle. To operate the projector in another forward project mode, the control knob 104 is rotated causing the film shuttle 98 to be enabled, as is more fully described in U.S. Letters Pat. No. 3,787,003.

Thus, an automatic mechanical rewind mechanism for a motion picture projector has been described which utilizes the benefits of a roller drive at both the supply and take-up reels and yet automatically senses when the forward project mode has been completed and enables the film to be rewound across the projection axis automatically without the need for further operator assistance. It should be understood of course, that the foregoing disclosure relates to only a preferred embodiment of the invention and that numerous modifications or alterations may be made therein without departing from the spirit and the scope of the invention as set forth in the appended claims.

What is claimed is:

1. In combination with a motion picture projector having a supply reel with one end of a film attached thereto, a take-up reel, a forward projection mode, a rewind mode, a projection axis, a shuttle for moving said film across said projection axis; a mechanism for automatically rewinding said film across said projection axis comprising:

a motor driving means;

a first roller supported for movement from an ineffective position to an effective position for engaging the flanges of the supply reel, said first roller in said effective position being rotatable by said motor drive means for winding film on the supply reel;

a second roller supported for movement from an ineffective position to an effective position for engaging the flanges of the take-up reel, said second roller in said effective position being rotatable by said motor drive means for winding film on the take-up reel;

sensing means for sensing an increase in film tension incident to an end of run condition upon completion of forward projection of said film; and control means responsive to said sensing means for automatically moving said second roller into said ineffective position and for moving said first roller into said effective position thereby rewinding said film from said take-up reel across said projection axis to said supply reel.

2. The rewind mechanism of claim 1 wherein said sensing means comprises:

a snubber means wherein said snubber means is pivotable from a first position to a second position and wherein said snubber means moves to said second position as a result of an increase in film tension.

3. The rewind mechanism of claim 2 wherein said control means comprises:

a first lever means movable in response to the movement of said snubber means;

trigger means operably connected to said first lever means operable between a first position and a second position whereby said trigger means is movable between said first position and said second position in response to the movement of said first lever means whereby movement of said trigger means to said second position causes said first roller means to move into said effective position and said second roller to move into said ineffective position.

4. The rewind mechanism of claim 3 wherein said control means further comprises:

a second lever means movable by said trigger means from a first position to a second position;

a gear means pivotable between an operative position and an inoperative position by said second lever means when said second lever means moves from said first position to said second position whereby said gear means in said operative position causes said first roller means to move into said effective position and enables said motor driving means to drive said first roller.

5. The rewind mechanism of claim 4 whereby said movement of said second lever means moves from said first position to said second position causes said second roller to move to said ineffective position.

6. In combination with a motion picture projector having a supply reel with one end of a film attached thereto, a take-up reel, a forward projection mode, a rewind mode, a projection axis, a shuttle for moving said film across said projection axis; a mechanism for automatically rewinding said film across said projection axis comprising:

a motor driving means;

a first roller supported for movement from an ineffective position to an effective position for engaging the flanges of the supply reel, said first roller in said effective position being rotatable by said motor drive means for winding film on the supply reel;

a second roller supported for movement from an ineffective position to an effective position for engaging the flanges of the take-up reel, said second roller in said effective position being rotatable by said motor driving means for winding film on the take-up reel;

snubber means for sensing an increase in film tension incident to an end of run condition upon completion of forward projection of said film wherein said snubber means is pivotable from a first position to a second position and wherein said snubber means moves to said second position as a result of an increase in film tension;

a first lever means movable in response to the movement of said snubber means;

trigger means operably connected to said first lever means operable between a first position and a second position whereby said trigger means is movable between said first position and said second position in response to the movement of said first lever means;

a second lever means movable by said trigger means from a first position to a second position; and a gear means pivotable between an operative position and an inoperative position by said second lever means when said second lever means moves from said first position to said second position whereby said gear means in said operative position causes said first roller means to move into said effective position and enables said motor driving means to drive said first roller and whereby said movement of said second lever means moves from said first position to said second position causes said second roller to move to said ineffective position thereby rewinding said film from said take-up reel across said projection axis to said supply reel.

* * * * *